United States Patent [19]

Wada et al.

[11] Patent Number: 4,561,989
[45] Date of Patent: Dec. 31, 1985

[54] HEAT STORAGE MATERIAL

[75] Inventors: Takahiro Wada, Katano; Ryoichi Yamamoto, Neyagawa; Fumiko Yokotani, Ibaraki, all of Japan

[73] Assignee: Matsushita Electric Industrial Co., Ltd., Kadoma, Japan

[21] Appl. No.: 635,578

[22] Filed: Jul. 30, 1984

[51] Int. Cl.$^4$ ................................................. C09K 5/06
[52] U.S. Cl. ...................................... 252/70; 126/400
[58] Field of Search .......................................... 252/70

[56] References Cited

FOREIGN PATENT DOCUMENTS 51-126979 11/1976 Japan .
57-40583 3/1982 Japan .

OTHER PUBLICATIONS

Van Galen, "Experimental Results of a Latent Heat Storage System Based on Sodium Acetate Trihydrate in a Stabilizing Colloidal Polymer Matrix, Tested as a Component of a Solar Heating System", Therm. Storage Sol. Energy, Proc. Int. TNO-Symp. 1980 (Pub. 1981), 147–156.

Primary Examiner—Paul Lieberman
Assistant Examiner—Robert A. Wax
Attorney, Agent, or Firm—Cushman, Darby & Cushman

[57] ABSTRACT

A heat storage material comprises a sodium acetate-water system containing at least 53–69% by weight sodium acetate ($CH_3CO_2Na$), wherein said heat storage material is mixed with a thickener comprising polyvinyl alcohol, paraffin and one or two components selected from the group consisting of formaldehyde and acetone, and has stable performance and little change of heat storage capacity even under repeated storage and release of heat.

2 Claims, No Drawings

HEAT STORAGE MATERIAL

BACKGROUND OF THE INVENTION

1. Field of the Invention

This invention relates to a heat storage material utilizing the latent heat of fusion of $CH_3CO_2Na \cdot 3H_2O$.

2. Description of the Prior Arts

Known heat storage materials utilize the sensible heat or the latent heat. A heat storage material utilizing the latent heat has a larger heat storage capacity per volume or mass than that utilizing the sensible heat, and can store a necessary amount of heat in a smaller quantity, permitting smaller size of the heat storage device. A heat storage material utilizing the latent heat can store and release heat at a constant transition temperature. A heat storage material which utilizes the latent heat of fusion of a hydrate, in particular, is known to have a larger heat storage capacity per unit volume.

$CH_3CO_2Na \cdot 3H_2O$ is heretofore known to have a particularly larger latent heat of fusion among hydrates. However, since the melting point of $CH_3CO_2Na \cdot 3H_2O$ is not a congruent melting point but a peritectic point, "phase separation" phenomenon proceeds in which $CH_3CO_2Na$ deposits on the bottom of the vessel as the fusion and solidification are repeated. For this reason, the latent heat of fusion of $CH_3CO_2Na \cdot 3H_2O$ is decreased naturally by repeated storage and release of heat. This decrease of the latent heat accompanying the phase separation has been a major problem when $CH_3CO_2Na \cdot 3H_2O$ is used as the heat storage material.

SUMMARY OF THE INVENTION

This invention provides a heat storage material having stable performance and little change of heat storage capacity even under repeated storage and release of heat, comprising sodium acetate and water, admixed with a thickener comprising polyvinyl alcohol, paraffin and one or two components selected from the group consisting of formaldehyde and acetone.

Further, the heat storage material in accordance with the present invention comprises a sodium acetate-water system containing at least 53–69% by weight sodium acetate ($CH_3CO_2Na$), wherein said heat storage material is mixed with a thickener comprising polyvinyl alcohol, paraffin and one or two components selected from the group consisting of formaldehyde and acetone.

DESCRIPTION OF THE PREFERRED EMBODIMENT

The invention is characterized in that a system comprising sodium acetate and water containing at least 53–69% by weight of $CH_3CO_2Na$ is mixed with a thickener comprising polyvinyl alcohol (PVA), paraffin and one or two components selected from the group consisting of formaldehyde and acetone; preferably, 100 parts by weight of a system of $CH_3CO_2Na$ and $H_2O$ is mixed with 0.5–20 parts by weight of PVA and 0.1–5 parts by weight of one or two components selected from the group consisting of formaldehyde and acetone.

Reagents on the market, $CH_3CO_2Na \cdot 3H_2O$, PVA, formaldehyde, acetone and paraffin were compounded with $H_2O$ in specified amounts into the compositions as shown in Table 1 and Table 2. Three types of PVA; about 500, 1500 and 2000 in polymerization degree and three types of paraffin; liquid paraffin, paraffin with a melting point of 42°–44° C., and one with an m.p. of 54°–56° C. were used.

TABLE 1

| Sample number | Composition comprising $CH_3CO_2Na$ and $H_2O$ | | PVA | | Formaldehyde Quantity (weight part) | Paraffin | |
|---|---|---|---|---|---|---|---|
| | $CH_3CO_2Na$ (weight %) | Quantity (weight part) | Degree of polymerization | Quantity (weight part) | | Kind* | Quantity (weight part) |
| 1 | 52 | 100 | 500 | 2 | 0.5 | a | 1.0 |
| 2 | 54 | 100 | 500 | 2 | 0.5 | a | 1.0 |
| 3 | 56 | 100 | 500 | 2 | 0.5 | a | 1.0 |
| 4 | 58 | 100 | 500 | 2 | 0.5 | a | 1.0 |
| 5 | 60 | 100 | 500 | 2 | 0.5 | a | 1.0 |
| 6 | 62 | 100 | 500 | 2 | 0.5 | a | 1.0 |
| 7 | 64 | 100 | 500 | 2 | 0.5 | a | 1.0 |
| 8 | 66 | 100 | 500 | 2 | 0.5 | a | 1.0 |
| 9 | 68 | 100 | 500 | 2 | 0.5 | a | 1.0 |
| 10 | 70 | 100 | 500 | 2 | 0.5 | a | 1.0 |
| 11 | 56 | 100 | 500 | 2 | 0.5 | a | 0 |
| 12 | 56 | 100 | 500 | 2 | 0.5 | a | 0.1 |
| 13 | 56 | 100 | 500 | 2 | 0.5 | a | 0.5 |
| 14 | 56 | 100 | 500 | 2 | 0.5 | a | 1.5 |
| 15 | 56 | 100 | 500 | 2 | 0.5 | a | 3.0 |
| 16 | 56 | 100 | 500 | 2 | 0.5 | a | 5.0 |
| 17 | 56 | 100 | 500 | 2 | 0.5 | a | 10.0 |
| 18 | 56 | 100 | 500 | 2 | 0 | a | 1.0 |
| 19 | 56 | 100 | 500 | 2 | 0.1 | a | 1.0 |
| 20 | 56 | 100 | 500 | 2 | 0.2 | a | 1.0 |
| 21 | 56 | 100 | 500 | 2 | 5.0 | a | 1.0 |
| 22 | 56 | 100 | 500 | 2 | 10.0 | a | 1.0 |
| 23 | 56 | 100 | 500 | 0 | 0.5 | a | 1.0 |
| 24 | 56 | 100 | 500 | 0.1 | 0.5 | a | 1.0 |
| 25 | 56 | 100 | 500 | 0.5 | 0.5 | a | 1.0 |
| 26 | 56 | 100 | 500 | 2.5 | 0.5 | a | 1.0 |
| 27 | 56 | 100 | 500 | 10 | 0.5 | a | 1.0 |
| 28 | 56 | 100 | 500 | 20 | 0.5 | a | 1.0 |
| 29 | 56 | 100 | 500 | 30 | 0.5 | a | 1.0 |
| 30 | 56 | 100 | 500 | 2 | 0.5 | b | 1.0 |
| 31 | 56 | 100 | 500 | 2 | 0.5 | c | 1.0 |

TABLE 1-continued

| Sample number | Composition comprising $CH_3CO_2Na$ and $H_2O$ | | PVA | | Formaldehyde Quantity (weight part) | Paraffin | |
|---|---|---|---|---|---|---|---|
| | $CH_3CO_2Na$ (weight %) | Quantity (weight part) | Degree of polymerization | Quantity (weight part) | | Kind* | Quantity (weight part) |
| 32 | 56 | 100 | 1500 | 2 | 0.5 | a | 1.0 |
| 33 | 56 | 100 | 2000 | 2 | 0.5 | a | 1.0 |

*a: Liquid paraffin
b: Paraffin having melting point of 42–44° C.
c: Paraffin having melting point of 54–56° C.

TABLE 2

| Sample number | Composition comprising $CH_3CO_2Na$ and $H_2O$ | | PVA | | Acetone Quantity (weight part) | Paraffin | |
|---|---|---|---|---|---|---|---|
| | $CH_3CO_2Na$ (weight %) | Quantity (weight part) | Degree of polymerization | Quantity (weight part) | | Kind* | Quantity (weight part) |
| 34 | 52 | 100 | 500 | 2 | 0.5 | a | 1.0 |
| 35 | 54 | 100 | 500 | 2 | 0.5 | a | 1.0 |
| 36 | 56 | 100 | 500 | 2 | 0.5 | a | 1.0 |
| 37 | 58 | 100 | 500 | 2 | 0.5 | a | 1.0 |
| 38 | 60 | 100 | 500 | 2 | 0.5 | a | 1.0 |
| 39 | 62 | 100 | 500 | 2 | 0.5 | a | 1.0 |
| 40 | 64 | 100 | 500 | 2 | 0.5 | a | 1.0 |
| 41 | 66 | 100 | 500 | 2 | 0.5 | a | 1.0 |
| 42 | 68 | 100 | 500 | 2 | 0.5 | a | 1.0 |
| 43 | 70 | 100 | 500 | 2 | 0.5 | a | 1.0 |
| 44 | 56 | 100 | 500 | 2 | 0.5 | a | 0 |
| 45 | 56 | 100 | 500 | 2 | 0.5 | a | 0.1 |
| 46 | 56 | 100 | 500 | 2 | 0.5 | a | 0.5 |
| 47 | 56 | 100 | 500 | 2 | 0.5 | a | 1.5 |
| 48 | 56 | 100 | 500 | 2 | 0.5 | a | 3.0 |
| 49 | 56 | 100 | 500 | 2 | 0.5 | a | 5.0 |
| 50 | 56 | 100 | 500 | 2 | 0.5 | a | 10.0 |
| 51 | 56 | 100 | 500 | 2 | 0 | a | 1.0 |
| 52 | 56 | 100 | 500 | 2 | 0.1 | a | 1.0 |
| 53 | 56 | 100 | 500 | 2 | 0.2 | a | 1.0 |
| 54 | 56 | 100 | 500 | 2 | 5.0 | a | 1.0 |
| 55 | 56 | 100 | 500 | 2 | 10.0 | a | 1.0 |
| 56 | 56 | 100 | 500 | 0 | 0.5 | a | 1.0 |
| 57 | 56 | 100 | 500 | 0.1 | 0.5 | a | 1.0 |
| 58 | 56 | 100 | 500 | 0.5 | 0.5 | a | 1.0 |
| 59 | 56 | 100 | 500 | 2.5 | 0.5 | a | 1.0 |
| 60 | 56 | 100 | 500 | 10 | 0.5 | a | 1.0 |
| 61 | 56 | 100 | 500 | 20 | 0.5 | a | 1.0 |
| 62 | 56 | 100 | 500 | 30 | 0.5 | a | 1.0 |
| 63 | 56 | 100 | 500 | 2 | 0.5 | b | 1.0 |
| 64 | 56 | 100 | 500 | 2 | 0.5 | c | 1.0 |
| 65 | 56 | 100 | 1500 | 2 | 0.5 | a | 1.0 |
| 66 | 56 | 100 | 2000 | 2 | 0.5 | a | 1.0 |

*a: Liquid paraffin
b: Paraffin having melting point of 42–44° C.
c: Paraffin having melting point of 54–56° C.

A mixture of a specified composition was heated to 70° C. and vigorously stirred using a stirrer for about 60 minutes. A viscous white liquid was obtained. About 100 g of the sample was sealed in a capsule together with 0.5 g of $Na_4P_2O_7 \cdot 10H_2O$, an anti-supercooling agent for $CH_3CO_2Na \cdot 3H_2O$, and the latent heat of the sample was determined by the dropping method. The capsule containing the sample was heated at 70° C. for about 3 hours to melt the sample, and held further 4 hours at the temperature dropped to 60° C. The capsule was then put into a thermos containing water at about 30° C., and the latent heat of the sample was determined from the rising water temperature caused by it. Then, the capsule containing the sample was put in a water bath and repeatedly heated and cooled 1000 times between 70° C. and 35° C. The latent heat of the sample after 100 times and 1000 times of melting-solidification repetitions was determined by the above dropping method. The results are shown in Table 3. As the evaluation, they are marked in Table 3 with ◯ when the latent heat after 1000 melting-solidification repetitions is 45 cal/g or more, with Δ when it is in a range from 40 cal/g to 45 cal/g and with X when less than 40 cal/g. Those marked with ◯ can be used practically having a large heat storage capacity, and those marked with Δ can also be put to practical use with stabilized action, though the heat storage capacity is not so large.

TABLE 3

| Sample number | Latent heat after a first time (cal/g) | Latent heat after 100 times (cal/g) | Latent heat after 1000 times (cal/g) | Evaluation |
|---|---|---|---|---|
| 1 | 55 | 43 | 37 | X |
| 2 | 57 | 53 | 50 | ◯ |
| 3 | 58 | 57 | 57 | ◯ |

TABLE 3-continued

| Sample number | Latent heat after a first time (cal/g) | Latent heat after 100 times (cal/g) | Latent heat after 1000 times (cal/g) | Evaluation |
|---|---|---|---|---|
| 4 | 59 | 57 | 56 | ○ |
| 5 | 55 | 53 | 52 | ○ |
| 6 | 54 | 53 | 50 | ○ |
| 7 | 54 | 50 | 48 | ○ |
| 8 | 52 | 50 | 46 | ○ |
| 9 | 47 | 45 | 43 | △ |
| 10 | 45 | 43 | 39 | X |
| 11 | 57 | 50 | 38 | X |
| 12 | 57 | 53 | 49 | ○ |
| 13 | 56 | 54 | 53 | ○ |
| 14 | 57 | 56 | 55 | ○ |
| 15 | 56 | 54 | 54 | ○ |
| 16 | 53 | 53 | 52 | ○ |
| 17 | 50 | 47 | 44 | △ |
| 18 | 58 | 48 | 38 | X |
| 19 | 57 | 55 | 48 | ○ |
| 20 | 57 | 55 | 52 | ○ |
| 21 | 53 | 52 | 52 | ○ |
| 22 | 48 | 47 | 44 | △ |
| 23 | 58 | 45 | 34 | X |
| 24 | 57 | 51 | 43 | △ |
| 25 | 57 | 56 | 54 | ○ |
| 26 | 57 | 56 | 56 | ○ |
| 27 | 53 | 52 | 52 | ○ |
| 28 | 48 | 46 | 46 | ○ |
| 29 | 43 | 43 | 43 | △ |
| 30 | 57 | 56 | 56 | ○ |
| 31 | 57 | 55 | 55 | ○ |
| 32 | 56 | 55 | 55 | ○ |
| 33 | 56 | 55 | 55 | ○ |
| 34 | 53 | 43 | 38 | X |
| 35 | 56 | 54 | 52 | ○ |
| 36 | 57 | 57 | 57 | ○ |
| 37 | 58 | 57 | 56 | ○ |
| 38 | 55 | 54 | 53 | ○ |
| 39 | 53 | 53 | 52 | ○ |
| 40 | 50 | 48 | 48 | ○ |
| 41 | 49 | 47 | 46 | ○ |
| 42 | 47 | 44 | 43 | △ |
| 43 | 44 | 43 | 39 | X |
| 44 | 58 | 52 | 39 | X |
| 45 | 57 | 53 | 50 | ○ |
| 46 | 56 | 54 | 54 | ○ |
| 47 | 58 | 56 | 55 | ○ |
| 48 | 57 | 57 | 55 | ○ |
| 49 | 53 | 51 | 50 | ○ |
| 50 | 50 | 48 | 43 | △ |
| 51 | 58 | 48 | 38 | X |
| 52 | 56 | 54 | 49 | ○ |
| 53 | 56 | 55 | 53 | ○ |
| 54 | 54 | 54 | 52 | ○ |
| 55 | 49 | 47 | 44 | △ |
| 56 | 59 | 43 | 32 | X |
| 57 | 57 | 53 | 45 | △ |
| 58 | 57 | 55 | 55 | ○ |
| 59 | 58 | 56 | 55 | ○ |
| 60 | 54 | 53 | 52 | ○ |
| 61 | 50 | 48 | 47 | ○ |
| 62 | 45 | 44 | 43 | △ |
| 63 | 58 | 56 | 56 | ○ |
| 64 | 57 | 56 | 56 | ○ |
| 65 | 58 | 57 | 55 | ○ |
| 66 | 56 | 56 | 56 | ○ |

In Table 3, samples 1 to 10 are prepared from 100 parts by weight of a system of $CH_3CO_2Na$ and water containing a variable quantity of $CH_3CO_2Na$ in a range from 52 to 70% by weight, mixed with 2 parts by weight of PVA, 0.5 parts by weight of formaldehyde, and 1.0 part by weight of paraffin. Sample 1 whose $CH_3CO_2Na$-water system contains 52% by weight $CH_3CO_2Na$ releases as large as 55 cal/g heat at the first solidification, but after 1000 times of melting-solidification repetitions, the latent heat is decreased to 37 cal/g. Sample 2 whose $CH_3CO_2Na$—$H_2O$ system contains 54 parts by weight $CH_3CO_2Na$ has a latent heat of 50 cal/g after 1000 times of melting-solidification repetitions, considerably larger than sample 1. Samples 2-6 whose $CH_3CO_2Na$—$H_2O$ systems contain $CH_3CO_2Na$ in a range from 54 to 68% by weight have latent heats of 50 cal/g or more even after 1000 times of melting-solidifications repetitions. However, sample 10 whose $CH_3CO_2Na$-water system contains 70% by weight $CH_3CO_2Na$ has a latent heat of 39 cal/g after 1000 times of melting-solidification repetitions, rather smaller than sample 3. It is found that a heat storage material containing such a thickener shows a maximum latent heat when the composition of $CH_3CO_2Na$-water system is in $H_2O$ rich side than the given proportion, 60.28% by weight, of $CH_3CO_2Na$ in the $CH_3Na\cdot 3H_2O$ composition, that is, about 56–58% by weight $CH_3CO_2Na$.

Samples 11 to 17 are prepared from 100 parts by weight of a system comprising 50% by weight $CH_3CO_2Na$ and water, 2 parts by weight of PVA, and 0.5 parts by weight of formaldehyde mixed with paraffin in a range from zero to 10% by weight. Sample 11 which is free of paraffin has a large initial latent heat of 57 cal/g, but the latent heat largely decreases to 50 cal/g after 100 times and 38 cal/g after 1000 times of melting-solidification. Sample 12 containing 0.1 parts by weight of paraffin has a latent heat of 49 cal/g after 1000 times, considerably larger than that of sample 11. Samples 13 to 16 containing paraffin in a range from 0.5 to 5 parts by weight have larger latent heats of 50 cal/g or more after 1000 melting-solidification repetitions. In sample 17 which is mixed with 10 parts by weight of paraffin, however, the latent heat after 1000 melting-solidification repetitions is decreased to 44 cal/g.

Samples 18–22 comprise 100 parts by weight of a system of 56% by weight $CH_3CO_2Na$ and water, 2 parts by weight of PVA, and 1 part by weight of paraffin, mixed with a varying amount of formaldehyde in a range from zero to 10 parts by weight. Sample 18 which is free of formaldehyde has a large initial latent heat of 58 cal/g, but it decreases to 48 cal/g after 100 times and to 38 cal/g after 1000 times. Sample 19 which contains 0.1 parts by weight of formaldehyde has a latent heat of 48 cal/g after 1000 melting-solidification repetitions, a considerably smaller decrease in comparison with sample 18. Samples 20 and 21 containing formaldehyde in a range from 0.2 to 5 parts by weight have latent heats of 50 cal/g or more after 1000 melting-solidification repetitions. However, sample 22 which contains 10 parts by weight of formaldehyde has a latent heat after 1000 melting-solidification repetitions decreased to 44 cal/g.

Samples 23–29 comprise 100 parts by weight of a system comprising 56% by weight $CH_3CO_2Na$ and water, 0.5 parts by weight of formaldehyde, and 1 part by weight of paraffin mixed with PVA in varying amounts in a range from zero to 30 parts by weight. Sample 23 which is free of PVA has the initial latent heat as large as 59 cal/g, but it decreases to 45 cal/g after 100 times and to 34 cal/g after 1000 times of melting-solidification repetition. In sample 24 which contains 0.1 part by weight of PVA, the latent heat after 1000 times is 43 cal/g, considerably larger than that of sample 23. Samples 25–27 containing PVA in a range from 0.5 to 10 parts by weight have latent heat after 1000 times of melting-solidification repetition as large as 50 cal/g or more. However, sample 29 containing 30 parts by weight of PVA has a latent heat after 1000 times of melting-solidification repetition of 43 cal/g, considerably smaller in comparison with that of sample 26.

Samples 30 and 31 use paraffin having melting point higher than room temperature, instead of liquid paraffin on the market used so far. Little difference is found in their latent heat from that of samples using liquid paraffin.

Samples 32 and 33 use PVA of about 1500 and about 2000 in polymerization degree, respectively. Little difference of latent heat is found in these cases from that when PVA of 500 in polymerization degree is used.

Data in Table 4 are then analyzed. Samples 34–43 comprise 100 parts by weight of a $CH_3CO_2Na$—$H_2O$ system containing a variable quantity of $CH_3CO_2Na$ in a range from 52 to 70% by weight, mixed with 2 parts by weight of PVA, 0.5 parts by weight of acetone, and 1.0 part by weight of paraffin. Sample 34 which contains 52% by weight $CH_3CO_2Na$ in the $CH_3CO_2Na$ system releases at the first solidification a large heat quantity of 53 cal/g, but it is decreased to 38 cal/g after 1000 times of melting-solidification repetitions. In sample 35 containing 54 parts by weight of $CH_3CO_2Na$ in the $CH_3CO_2Na$—$H_2O$ system, the latent heat after 1000 times of melting-solidification repetition is 52 cal/g, considerably larger than sample 1. Samples 35–39 which contain $CH_3CO_2Na$ in a range 54–68% by weight have latent heat larger than 50 cal/g even after 1000 times of melting-solidification repetition. However, sample 10 which contains 70% by weight $CH_3CO_2Na$ in the $CH_3CO_2Na$—$H_2O$ system has a latent heat of 39 cal/g after 1000 times of repetition, considerably small in comparison with sample 36 which has a large latent heat. It is found in the heat storage material containing such thickeners that the maximum latent heat appears when the composition of the $CH_3CO_2Na$—$H_2O$ system is in $H_2O$-rich side than the given ratio of $CH_3CO_2Na \cdot 3H_2O$ composition, 60.28% by weight $CH_3CO_2Na$, that is, about 56–58% by weight $CH_3CO_2Na$.

Samples 44–50 comprise 100 parts by weight of a $CH_3CO_2Na$—$H_2O$ system containing 56% by weight of $CH_3CO_2Na$, 2 parts by weight of PVA, and 0.5 parts by weight of acetone, mixed with paraffin in a varied quantity in the range from zero to 10% by weight. In sample 44 which is free of paraffin, the latent heat at the first solidification is as large as 58 cal/g, but it largely decreases to 52 cal/g after 100 times, and to 39 cal/g after 1000 times of melting-solidification repetition. In sample 45 containing 0.1 parts by weight of paraffin, the latent heat after 1000 melting-solidification repetitions is 50 cal/g, considerably larger than that in sample 44. In samples 46–49 which contain paraffin in a range of 0.5–5 parts by weight, the latent heat after the 1000 repetitions is as large as 50 cal/g or more. However, in sample 50 which contain 10 parts by weight of paraffin, the latent heat after the 1000 repetitions decreases to 43 cal/g.

Samples 51–55 comprise 100 parts by weight of a $CH_3CO_2Na$—$H_2O$ system containing 56% by weight $CH_3CO_2Na$, 2 parts by weight of PVA, and 1 part by weight of paraffin, mixed with acetone in a varied quantity in a range from zero to 10 parts by weight. In sample 51 which is free of acetone, the latent heat at the first solidification is as large as 58 cal/g, but it decreases to 48 cal/g after 100 times and to 38 cal/g after 1000 times of melting-solidification repetition. In sample 52 containing 0.1 part by weight of acetone, the latent heat after the 1000 repetitions is 49 cal/g, considerably smaller decrease in comparison with sample 51. Samples 53 and 54 containing 0.2 to 5 parts by weight of acetone have large latent heats of 50 cal/g or more after 1000 times of melting-solidification repetition. However, in sample 56 containing 10 parts by weight of acetone, the latent heat after 1000 times of the repetition is decreased to 44 cal/g.

Samples 56–62 comprise 100 parts by weight of a $CH_3CO_2Na$—$H_2O$ system containing 56% by weight of $CH_3CO_2Na$, 0.5 parts by weight of acetone, and 1 part by weight of paraffin, mixed with a varied quantity of PVA in a range from zero to 30 parts by weight. In sample 56 which is free of PVA, the latent heat at the first solidification is as large as 59 cal/g, but it is decreased to 43 cal/g after 100 times and to 32 cal/g after 1000 times of melting-solidification repetition. In sample 57 containing 0.1 parts by weight of PVA, the latent heat after the 1000 repetitions is 45 cal/g, considerably large in comparison with sample 56. In sample 58–60 containing PVA in a range of 0.5–10 parts by weight, the latent heat after 1000 melting-solidification repetitions is as large as 50 cal/g or more. However, sample 62 containing 30 parts by weight of PVA has a latent heat of 43 cal/g after 1000 times of the repetition, considerably reduced in comparison with sample 59.

Samples 63 and 64 use PVA of about 1500 and 2000 in polymerization degree, respectively. In these cases, the latent heat is little different from that in the case where PVA of 500 in polymerization degree is used.

As shown above, a $CH_3CO_2Na$ system containing $CH_3CO_2Na$ in a range from 53 to 69% by weight provides, when admixed with a thickener comprising PVA, paraffin and one or two components selected from the group consisting of formaldehyde and acetone give a heat storage material which has a stabilized heat storage capacity little changed even after being subjected to repeated melting and solidification. A preferable composition of the heat storage material is in the range marked by     in Tables 3 and 4, that is, 100 parts by weight of the system comprising $CH_3CO_2Na$ and $H_2O$, 0.5–20 parts by weight of PVA, 0.1–5 parts by weight of one or two components out of formaldehyde and acetone, and 0.1–5 parts by weight of paraffin.

INDUSTRIAL UTILITY

The heat storage material according to the invention is provided with a very stable performance of heat storage with little change of the capacity even after repeated melting and solidification, being composed of a $CH_3CO_2Na$—$H_2O$ system containing 53–69% by weight of $CH_3CO_2Na$ and mixed with a thickner comprising PVA, paraffin and one or two components selected from the group consisting of acetone and formaldehyde to prevent phase separation as described above. Therefore, it can be widely applied to a field using heat storage including a heat storage device for air conditioning.

What is claimed is:

1. A heat storage material comprising a sodium acetate-water system containing at least 53–69% by weight sodium acetate ($CH_3CO_2Na$), wherein said heat storage material is mixed with a thickener comprising polyvinyl alcohol, paraffin and one or two components selected from the group consisting of formaldehyde and acetone.

2. A heat storage material according to claim 1, wherein 100 parts by weight of said heat storage material comprising a sodium acetate-water system is admixed with 0.5–20 parts by weight of polyvinyl alcohol, 0.1–5 parts by weight of one or two components selected from the group consisting of formaldehyde and acetone, and with 0.1–5 parts by weight of paraffin.

* * * * *